Figure 1:
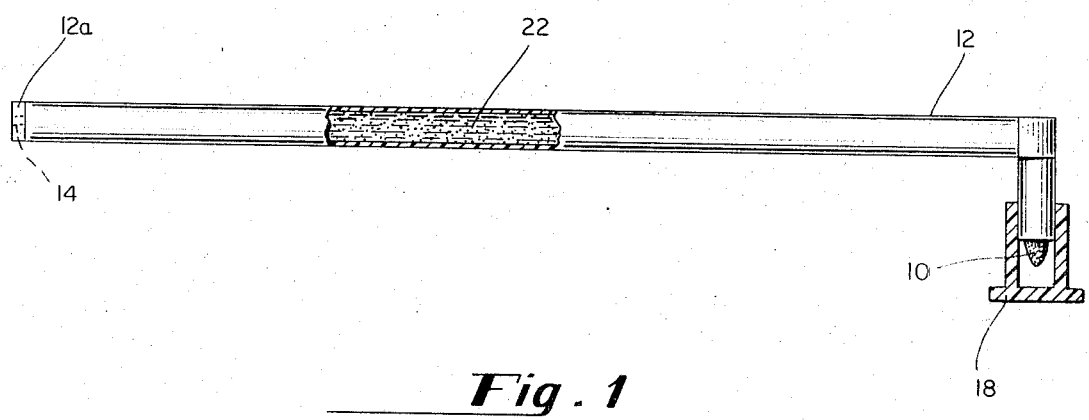

United States Patent [19]

Hubbard

[11] 3,849,143

[45] Nov. 19, 1974

[54] INK STORAGE COMPOSITION

[75] Inventor: James R. Hubbard, Moorestown, N.J.

[73] Assignee: Graphic Controls Corporation, Buffalo, N.Y.

[22] Filed: Dec. 1, 1972

[21] Appl. No.: 311,351

[52] U.S. Cl............... 106/22, 106/19, 106/288 B, 106/311, 106/316, 117/112, 117/126 AF, 117/126 AB
[51] Int. Cl............................................ C09d 11/00
[58] Field of Search............ 106/19, 22, 288 B, 311, 106/316; 117/126 R, 126 AQ, 126 AB, 126 AF, 117–112, 121.2

[56] References Cited
UNITED STATES PATENTS

| 135,252 | 1/1873 | Sutherland | 117/112 |
| 2,487,557 | 11/1949 | Jourgensen | 54/1 |
| 3,304,197 | 2/1967 | Pundsack et al | 117/126 |
| 3,519,591 | 7/1970 | Bolger | 117/126 |
| 3,705,045 | 12/1972 | Nadolski | 106/22 |

Primary Examiner—Joseph L. Schofer
Assistant Examiner—T. S. Gron
Attorney, Agent, or Firm—Miller, Frailey & Prestia

[57] ABSTRACT

A viscous, single phase composition consisting of chrysotile asbestos fibers, of fineness grades 5-7, intimately combined with liquid ink can be injected into marker bodies. In contact with a fine capillary or fibrous nib, the liquid ink is released from the particulate material. The ink storage composition thus combines the fillability of liquid inks with the leak resistance of fibrous reservoir systems.

12 Claims, 2 Drawing Figures

PATENTED NOV 19 1974  3,849,143

INK STORAGE COMPOSITION

This invention is related to ink storage systems for markers or marking pens with capillary nibs or ink delivery means (e.g. fiber tips), and to markers including such storage systems. More specifically, this invention is related to an ink composition which may be injected into a marker body of any shape or configuration.

Generally, marking pens with capillary nibs fit into two major categories, handwriting pens, which are typically barrel shaped and similar in configuration to fountain pens and automatic pencils, and instrument writing pens, which assume a variety of shapes, including cylindrical, rectangular, etc., based primarily on the writing performance required and the space available in the instrument. Prior art markers or marking pens of both of these types have depended upon either of two basic types of ink storage systems.

The first such ink storage system is that in which the ink is in liquid form. A notorious disadvantage of this type of storage system is that the liquid ink leaks through the nib and through the reservoir vent.

The second type of ink storage system used in such markers is that in which the ink is stored in a capillary type of reservoir consisting of a fibrous body saturated with ink. These fibrous bodies usually consist of cellulose acetate or polyester fibers, and are usually available only in cylindrical or other very simple shapes. In this type of storage system, leakage is not a problem but other inherent disadvantages are. These include cost, the amount of ink which can be stored in a given volume (or more importantly, the writing distance obtainable with a given reservoir volume), the available shapes of reservoir material, and the difficulty in filling the reservoir with ink and in inserting a filled or unfilled reservoir into a pen.

Recognizing these inherent disadvantages of the two basic types of ink storage systems used in capillary nib markers, the present invention has as its primary object the provision of an ink storage system which permits direct filling of the marker body with an ink composition, as in liquid storage systems, yet provides the inherent leakage resistance of the fibrous body storage system. In addition, it is a further object of this invention to provide a leak-proof ink storage system and a capillary nib marker including such a system, which is easily adaptable to a variety of shapes and sizes of marker bodies and which is more efficient in terms of the amount of liquid ink stored in a given volume of marker body and in the time and effort required to fill the marker with the ink.

Finally, it is an object of this invention to provide an economical and practical ink storage system, more specifically, an ink composition upon which such a system is based, which facilitates marker manufacture, prolongs marker life, and enhances marker reliability.

Briefly, these and other objects which will become apparent in the course of the subsequent description of the invention, are met by a viscous, uniformly dispersed, single phase composition consisting of chrysotile asbestos fibers combined with ink and from which the ink is releasable by means of physical contact with a capillary ink delivery means or nib. For practical reasons, the ink should comprise at least 70 percent by volume, of the ink-asbestos composition, and the ink and asbestos should be relatively inert with respect to one another. Generally, an ink having some slight degree of polarity is thought to be required in order to be bound by the surface attraction of the asbestos fibers. Thus, water based inks with either acid or basic dyes may be used as well as organic ink with some polarity. By "single phase" is meant a uniformly dispersed liquid-solid mixture in which, at most, only an insignificant amount of the liquid will separate on standing at atmospheric conditions and which does not otherwise tend to separate.

While polar inks of either the water-based or organic solvent-based types may be used in the present invention, the ink storage system of the present invention in its preferred form is based on a combination of chrysotile asbestos fibers, more particularly asbestos of grades 5–7 (based on a Quebec Standard Screen Test) and water based ink with acid dye.

Figure 2:
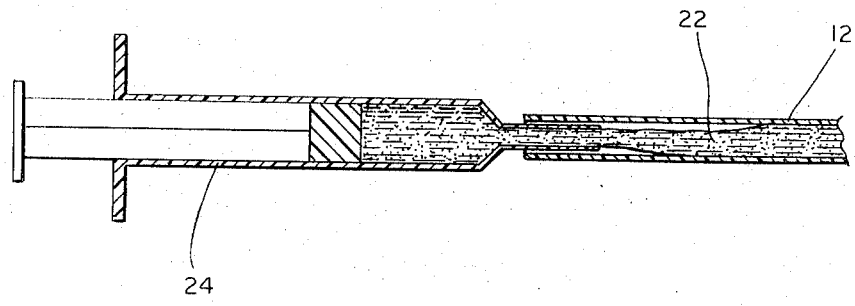

This invention may be better understood by reference to the appended claims, taken in conjunction with the more detailed description which follows and the drawings, in which:

FIG. 1 is an assembly view of a marker, partially in section, in which is incorporated the novel ink storage composition of the present invention; and FIG. 2 is a schematic illustration of a system for filling markers of the type shown in FIG. 1 with the novel ink storage composition of the present invention.

Referring more specifically to FIG. 1, there is shown an instrument marker consisting of a capillary nib 10 sometimes referred to synonymously as an ink delivery means or writing tip, marker body 12 with vent 14, nib cap 18, and ink storage composition 22. Vent 14 is disposed in an end piece 12a which is inserted into body 12 after body 12 has been filled with ink composition 22. Nile cap 18 prevents drying of ink and atmospheric contamination thereof during storage of the marker shown in FIG. 1.

In operation, capillary nib 10 draws ink by capillary attraction from ink storage composition 22 by means of physical contact therewith and deposits ink transferred therethrough to a writing surface in pressure contact with the opposite end of capillary nib 10.

In FIG. 2, there is shown one form of apparatus for filling markers of the type shown in FIG. 1 in a practical and economical manner, consistent with the objectives of this invention. More specifically, marker body 12 before insertion or assembly of the other components of the marker and before end piece 12a has been assembled with marker body 12, is filled with ink storage composition 22 by means of injection from a hypodermic needle-type delivery means 24. Obviously, a variety of other suitable filling means may be substituted, so long as there is provided a delivery means which fits into or mates with one opening in marker body 12 and through which ink storage composition 22 is supplied under pressure so that it is forcibly driven into and fills the storage area of marker body 12. This need not necessarily occur prior to insertion of nib 10 but some means must be provided for venting the air displaced by the incoming ink storage composition 22.

As pointed out above, the ink storage composition of this invention necessarily consists of asbestos fibers and an ink combined therewith in a flowable viscous, single phase, uniformly dispersed composition from which the ink is substantially releasable by means of physical contact with a capillary nib or other ink delivery means. While the ink and asbestos fibers must be relatively inert with respect to one another so that the ink is eventually deposited on a writing surface without any significant contamination or modification of the ink, the ink and the asbestos must have a certain amount of mutual attractiveness so as to form the viscous single phase composition which is essential to the present invention. This mutual attractiveness is thought to be based on the surface tension of the liquid ink, and the chemical characteristics of the asbestos and the liquid ink which may permit weak chemical bonds such as hydrogen bonding, van der Waals forces, charge attraction and dipole attraction.

Other phenomena not yet identified may also be present. In any event, the summation of these forces should be sufficient to permit at least 70 volume percent of the liquid ink to be combined with the asbestos in an essentially single phase composition. This volume percentage is calculated as the volume of liquid ink, prior to combination which is combined with the asbestos to form a single phase composition, i.e., a composition in which no free or liquid ink is present and which does not settle or separate on standing, divided by the total volume of ink and asbestos after the combination thereof $\times$ 100. If less than 70 volume percent of liquid ink is contained in the combination, the storage system is less attractive since a larger volume of marker reservoir capacity is required for a given amount of writing.

The single phase composition formed by the ink and particulate material must also be "viscous." As used herein, the word viscous refers to a semi-solid state in which the particulate material-ink combination is neither free-flowing nor plastic, i.e., will not of its own accord retain any particular shape. To facilitate manufacture of pens using the composition of this invention, the composition should be extrudable, though not necessarily through an extrusion means of any particular dimension, and may be pourable although the extent of its pourability must not be so great as to approach the free-flowing characteristic which is to be avoided. By "extrudable" is meant it must be capable of being forced through an opening, preferably on the order of 0.056 inches in diameter, without significant liquid-solid separation.

Reference has also been made to the fact that the liquid ink must be substantially releasable from the asbestos-ink combination. There are two aspects to this requirement. First, the summation of forces responsible for the mutual attractiveness of the asbestos and ink must not be so great that this attractiveness cannot be overcome by the capillary attractiveness for the ink of the capillary nib or ink delivery means of the marker in which the ink storage system is to be used. Second, a significant volume of the liquid ink must ultimately be recoverable from the novel ink storage system in a marker incorporating such a system in order for the ink storage system to be advantageous. Write-out distance is the preferred basis for evaluating the ink storage composition of this invention and for comparison to the art. It depends on both volume percent ink in the system and percent yield.

As to ink releasability, fibrous body storage systems of the prior art typically yield a greater proportion of the ink held therein as compared to the compositions of the present invention. However, in identical ink storage compartment volumes, the present invention allows storage of a larger quantity of ink than the conventional fibrous body reservoir. Thus, even though the ink yield, based on ink input, may be somewhat lower in the present invention, greater write-out distance is obtainable because of the more efficient use of reservoir space or volume in the marker body.

Following are various examples of ink storage compositions produced in accordance with the present invention:

Example I — All Purpose Ink-Medium Fast Drying

| | |
|---|---|
| Water | 50.61% (by weight) |
| Dye (acid) | 2.81 |
| Glycerine | 25.70 |
| Preservative | 1.20 |
| Asbestos fibers, Grade 7R | 19.68 |

Example II — General Purpose Ink-Slow Drying

| | |
|---|---|
| Water | 31.0% (by weight) |
| Dye (acid) | 1.5 |
| Glycerine | 49.0 |
| Preservative | 1.2 |
| Asbestos fibers, Grade 7R | 17.3 |

Example III — High Pen Speed Ink

| | |
|---|---|
| Water | 44.4% (by weight) |
| Dye (acid) | 3.2 |
| Ethylene Glycol | 31.7 |
| Preservative | 1.2 |
| Wetting Agent | .5 |
| Asbestos fibers, Grade 7R | 19.0 |

Example IV — Non-Aqueous Ink - Slow Drying

| | |
|---|---|
| Methoxytriglycol | 40pbw (parts by weight in ink) |
| Benzylalcohol | 40pbw |
| Dye (solvent soluble) | 6pbw |
| Resin (polyvinylpyrollidone) | 10pbw |
| Asbestos fibers, Grade 7R | 75% (by weight) — ink / 25% — fibers |

From the foregoing description and examples, it can be seen that a highly practical and efficient ink storage system has been developed which incorporates many of the advantages of the prior art systems while avoiding the primary disadvantages thereof. Further, this ink storage system of the present invention facilitates manufacture of capillary nib markers incorporating such ink storage means. Obviously, a large variety of asbestos fibers and inks may be combined in accordance with the present invention. While no overall theory as to the physical and chemical requirements of the individual meterials has been devised, it is thought that the foregoing description and illustrations are sufficiently definitive so as to permit those skilled in the art to select fibers and ink in accordance with specific requirements.

Generally, the scientific phenomena upon which the present invention is based, while not fully understood, is believed to involve a summation of forces resulting from the interaction of the asbestos with the ink, and particularly from such physical and chemical characteristics as surface tension, hydrogen bonding, van der Waals forces, charge attraction and dipole attraction. It is therefore not possible to delineate or to evaluate the individual contributive effects of these various interacting forces. Nor is it possible to generalize as to minimum and maximum requirements with respect to each of these forces.

However, it does appear from tests to date that the relatively small particle size of the asbestos fibers, along with certain unique surface characteristics of the asbestos are important to the present invention. The surfaces of asbestos fibers tend to be smooth. As a result, the compositions of this invention tend to have great lubricity which facilitates their injectability. The surfaces of the asbestos fibers also have numerous polar sites. Ink having some polarity therefore tends to be attracted to these sites where some polar or hydrogen bonding is thought to occur; that is thought to be a factor in the way the fibers bind the ink in the single phase compositions of this invention. Further, in some cases, the attractive forces between the asbestos and an acid dye-water based ink can be increased by a downward adjustment of pH, thereby resulting in an equilibrium shift, which allows a greater attraction of ink to the asbestos. For reasons of ink yield, as discussed hereinafter, this may be undesirable and is therefore generally not preferred.

Further, cylindrical or rod-shaped (i.e. fibrous) asbestos is thought to be required to enhance the extrudability of the combination. This permits the combination to be extruded through smaller orifices as the cylindrical particles will orient themselves in a conical entrance to the extrusion orifice. In addition, the particulate material should include a small portion of fine particle material (already included in several commercial grades of asbestos), not exceeding 5 percent of the total weight of asbestos, in the ink/asbestos combination. This proportion of fine particle size material (0.0029 inch to 0.0059 inch, 200 and 100 mesh, respectively), allows for a greater yield of ink from the pen, thereby resulting in greater write-out distance. This phenomena is attributed to these smaller particles intruding between the longer fibers, thereby reducing the occurrence of fiber packing, which in turn restricts and/or interrupts the ink flow, resulting in premature pen failure.

With regard to the asbestos, inks, ink dyes, and proportions of materials which are useable in the present invention, certain additional guidelines are known.

Referring to grades of chrysotile asbestos fibers, as classified by a "Quebec Standard Asbestos Testing Machine" and described in "Textile Fibers," published by John Wiley and Sons, New York, 6th Edition, pages 1050 – 1052, asbestos grades 5K through 7T have been used to make the single phase, injectable, ink releasable, ink slurry compositions of the present invention. Smaller particle size asbestos, such as grade 8T and the fines removed from a grade 7R mixture are not suitable. Ink slurries made with these materials tend to pack and to clog the ink system.

Published literature of the Johns-Manville Sales Corporation, of Manville, New Jersey, a commercial source of the fibers used in this invention, indicates these grades to be further sub-divided by a suffix designation of texture. With these added suffix designations, the grades of fibers used to date and the results obtained in a standard test, are indicated as follows (a single phase composition was obtained in each case with a 20 percent by weight fiber content, the ink consisting of 32 percent glycerine, 63 percent water, and 3 to 4 percent dye, by weight).

The following table illustrates the relative efficiencies of various asbestos fiber grades when used in the present invention. The fiber content in all cases is 20 percent by weight.

| Grade | % Ink Recovered* | Writing Distance (feet)* |
|---|---|---|
| 5K04 | 18.76 ± 8.98 | 616 ± 1069 |
| 7D24 | 36.22 ± 9.95 | 1576 ± 312 |
| 7K05 | 38.40 ± 8.69 | 1167 ± 960 |
| 7R06 | 27.52 ± 29.23 | 1637 ± 127 |
| 7T05 | 37.47 ± 17.0 | 1800 ± 200 |
| 7TF02 | 49.59 ± 2.3 | 1853 ± 110 |
| 8T | No good, too dense, packs and clogs pen. | |

* ± Indicates statistically probable deviation of 2 sigma.

(In the above table, the suffix designations "04" indicates "long fibers, well opened;" "24" indicates "long fibers," "semi-crudy;" and "05" and "06" indicate "short fibers," "medium bulk and absorption.")

Thus, Grade "5K04" is marginally acceptable in this invention. The Quebec Standard and the Johns-Manville literature indicates this grade to have the following characteristics:

0 percent retained on the first two screens of the Quebec Test (having screen openings of 0.500 and 0.187 inches, respectively, and wire diameters of 0.105 inches and 0.063 inches (4 mesh), respectively); 75 percent retained on third screen (having screen openings of 0.053 inches and wire diameter of 0.047 inches).

Moreover, asbestos grade 7T yields the greatest writing distance. This grade is one in which all of the fibers pass through all of the screens of the Quebec Standard Test. Grade 7TF02, which yields the greatest writing distance, differs from other group 7 grades by including a higher proportion of fines.

Grade 8T and, as indicated above, the fines (200 mesh and below) removed from a grade 7R06 are too dense and cause clogging. Grade 8T designates fibers having a bulk density between 50 pounds per cubic foot and under 75 pounds per cubic foot.

On this basis, it has been concluded that asbestos fibers of Quebec Standard grades 5 through 7 are useful in the present invention with grades 7R and 7T being preferred.

Because the ability of the asbestos fibers to bind the ink in this invention is thought to depend, to some extent, on the polar sites on the asbestos surface and the mutually attractive polar solvents and dyes found in many inks, inks with solvents and/or dyes not having these characteristics may not be useful in the present invention. Water-based inks inherently satisfy this requirement, as do solvent based inks including polar solvents. Such inks are preferred. Acid dyes, including sulfonic or carboxylic acid groups, are preferred for the same reason.

Typically, inks are comprised primarily of a solvent and a dye. In water-based inks, the solvent is water. In non-aqueous inks, the solvent is usually one or more polar compounds selected from the group consisting of alcohols, glycol ethers, esters, and ketones. Like dyes generally, ink dyes are rendered attractive, both to their solvent carrier and to their ultimate intended substrate to be dyed, by the inclusion in the dye molecule of a substituent group, usually referred to as an auxochrome. Typical auxochromes are amino groups and hydroxyl groups in the case of what are known as basic dyes. Sulfonic acid and carboxylic acid groups usually comprise the auxochromes in acid dyes.

Basic dyes are readily attracted to and bound by the asbestos fibers used in the present invention. Therefore, such dyes tend to be tightly bound on the asbestos fibers thereby creating a lighter written line. Precipitation of basic dyes in such solutions is also a problem, although this may be avoided, at least temporarily by downward adjustment of the pH of the system; the pH of typical basic dye inks is usually in the range of 2.5 to 5.0.

In contrast, acid dyes, particularly those including sulfonic acid and carboxylic acid group substituents, have a normal water solution pH of about 7.5–10.0 or higher. Typical inks using these dyes are adjusted to a pH of about 7.5 in order to eliminate degradation of the resin binder in paper. The addition of asbestos fibers to such an ink increases its pH to about 8.5–9.5, at which pH the viscous single phase composition is highly stable.

Readjustment of the pH of the asbestos fiber-acid dye class compositions of the present invention to 7.5 is not preferred since this seems to cause an equilibrium shift which causes a greater attraction of ink to asbestos and, as a result, reduced ink yield and write-out distance.

Some of the dyes which have been used in inks combined with asbestos fibers in compositions of the present invention include the following:

cluding, for example, alcohols, such as isopropanol and glycol ethers, such as ethylene glycol monoethyl ether.

Further information on each of the foregoing dyes may be found in Part D of the Technical Manual of the American Association of Textile Chemists and Colorists, 1966, Research Triangle Park, Durham, N.C., 27,702.

No limitations are known on the proportions of ink constituents and asbestos fibers in the present invention. Obviously, with more absorbent fiber classes, a lower proportion of fibers may be required to hold a given amount of ink or a larger quantity of ink may be necessary to obtain some pre-selected ink yield. If the ink slurry is intended for high temperature application, the ink proportion may be lowered to avoid bleeding or phase separation at a higher temperature. In any event, the ink proportion must not exceed that which can be retained by the fibers, without bleeding or phase separation. As pointed out above, if the composition includes less than 70 volume percent ink, it would probably not be economically attractive although for some purposes lower ink contents may be acceptable.

By way of comparing the present invention to the prior art fibrous body storage systems and to ink slurries similar to the present invention with the fine fibers removed, several tests (using the same ink in all cases) were conducted with the following results:

|   |   |   | % Recovered | Writing Distance (feet) |
|---|---|---|---|---|
| 1. Standard Pen, | fibrous body reservoir | | 80.8 ± 13% | 2000 ± 1370 |
| 2. Standard Pen, | asbestos fiber - (Grade 7R) - ink slurry | | 57 ± 15% | 2460 ± 1284 |
| 3. Standard Pen, | asbestos fiber - (Grade 7R, fines removed) - ink slurry | | 42 ± 30% | 2020 ± 798 |
| 4. Standard Pen, | asbestos fiber - (Grade 7R) - same amount of ink as in 1. (above) | | 70 ± 11% | 2000 ± 490 |
| 5. Standard Pen, | asbestos fiber - ink slurry, as in 2. (above) w/pH adjusted from 8-9 to 7.5 | | 48 ± 22% | 2130 ± 250 |

| Dye Index Number | Chemical Index Reference | Classical Name |
|---|---|---|
| 42535 | C.I. Basic violet 1 and C.I. pigment violet 3 | Methyl Violet |
| 50415 | C.I. Solvent black 5 | Nigrosine Spirit Soluble |
| 18890 | C.I. Acid yellow 34 | |
| 19140 | C.I. Acid yellow 23 and C.I. food yellow 4 | |
| 42640 | C.I. Acid violet 49 and C.I. food violet 2 | |
| 14720 | C.I. Acid red 14 and C.I. food red 3 | |
| 18050 | C.I. Acid red 1 and C.I. food red 10 | |
| 27290 | C.I. Acid red 73 | |
| 16255 | C.I. Acid red 18 and C.I. food red 7 | |
| 16230 | C.I. Acid orange 10 and C.I. food orange 4 | |
| 42085 | C.I. Acid green 3 and C.I. food green 1 | |
| 42090 | C.I. Acid blue 9 and C.I. food blue 2 and C.I. pigment blue 24 | |

Of the foregoing, 42,535 is a basic dye and is therefore not preferred. Dye 50,415 is used in a solvent-based ink. Such inks are based on polar solvents, in- While this invention has been described with respect to specific embodiments thereof, it is by no means limited thereto and the appended claims are intended to cover all such equivalent variations and modifications of this invention as will be apparent to those skilled in the art.

I claim:

1. A composition consisting essentially of a viscous single phase, uniformly dispersed mixture of chrysotile asbestos fibers of grades 5-7 and a fluid ink comprising at least one polar solvent and a dye soluble therein, said fluid ink comprising at least 70 volume percent of said composition and being releasable from retention by said fibers in said single phase mixture by means of physical contact with a capillary ink delivery means.

2. A composition, as recited in claim 1, wherein said dye is a dye including acid group substituents.

3. A composition, as recited in claim 2, wherein said acid dye is a dye including sulfonic or carboxylic acid group substituents.

4. A composition, as recited in claim 3, wherein said polar solvent is water.

5. A composition, as recited in claim 1, wherein said polar solvent comprises at least one compound selected from the group consisting of water, alcohols, glycol ethers, esters, and ketones and said dye is spirit soluble therein spirit.

6. A composition, as recited in claim 1, wherein said fibers are of grade 7R or 7T.

7. A composition, as recited in claim 6, wherein said polar solvent is water and said dye includes sulfonic or carboxylic acid group substituents.

8. A marker consisting of a body filled with an ink storage composition consisting essentially of a viscous single phase, uniformly dispersed mixture of chrysotile asbestos fibers of grades 5–7 and a fluid ink comprising at least one polar solvent and a dye soluble therein, said fluid ink comprising at least 70 volume percent of said composition and being releasable from retention by said fibers in said single phase mixture by means of physical contact with a capillary ink delivery means, said body including a vent opening through said body, and a fibrous writing nib extending from said body and contacting said composition within said body.

9. A marker, as recited in claim 8, wherein said dye is a dye including acid group substituents.

10. A marker, as recited in claim 8, wherein said fibers are of grades 7R or 7T.

11. A marker, as recited in claim 10, wherein said polar solvent is water and said dye includes sulfonic or carboxylic acid group substituents.

12. A marker, as recited in claim 10, wherein said polar solvent comprises at least one compound selected from the group consisting of water alcohols, glycol ethers, esters and ketones and said dye is soluble therein.

* * * * *

UNITED STATES PATENT OFFICE
CERTIFICATE OF CORRECTION

Patent No. 3,849,143          Dated November 19, 1974

Inventor(s) James R. Hubbard

It is certified that error appears in the above-identified patent and that said Letters Patent are hereby corrected as shown below:

Column 2, line 33, "Nile" should be --Nib--

Column 7, line 66, "42,535" should be --42535--

Column 7, line 67, "50,415" should be --50415--

Column 8, line 8, "27,702" should ne --27702--

Column 8, line 68, after "water" insert --,-- (comma)

Column 9, lines 1 and 2, "ethers, esters and ketones and said dye spirit is soluble therein spirit." should read --ethers, esters and ketones, and said dye is soluble therein.--

Signed and sealed this 18th day of March 1975.

(SEAL)
Attest:

RUTH C. MASON
Attesting Officer

C. MARSHALL DANN
Commissioner of Patents
and Trademarks